(12) United States Patent
Butler

(10) Patent No.: US 9,994,981 B2
(45) Date of Patent: *Jun. 12, 2018

(54) REINFORCEMENT SYSTEM

(71) Applicant: James J. Butler, Tucson, AZ (US)

(72) Inventor: James J. Butler, Tucson, AZ (US)

(*) Notice: Subject to any disclaimer, the term of this patent is extended or adjusted under 35 U.S.C. 154(b) by 56 days.

This patent is subject to a terminal disclaimer.

(21) Appl. No.: 15/096,115

(22) Filed: Apr. 11, 2016

(65) Prior Publication Data

US 2016/0222562 A1 Aug. 4, 2016

Related U.S. Application Data

(63) Continuation of application No. 14/186,571, filed on Feb. 21, 2014, now Pat. No. 9,307,796, which is a (Continued)

(51) Int. Cl.
| | |
|---|---|
| *D04H 3/04* | (2012.01) |
| *B29C 70/30* | (2006.01) |
| *B29C 70/54* | (2006.01) |
| *D04H 3/002* | (2012.01) |
| *D04H 3/004* | (2012.01) |
| *D04H 3/007* | (2012.01) |
| *D04H 3/009* | (2012.01) |
| *D04H 3/045* | (2012.01) |
| *D04H 3/115* | (2012.01) |
| *D04H 3/12* | (2006.01) |
| *A41D 27/20* | (2006.01) |

(52) U.S. Cl.
CPC ............... *D04H 3/04* (2013.01); *A41D 27/20* (2013.01); *B29C 70/30* (2013.01); *B29C 70/547* (2013.01); *D04H 3/002* (2013.01); *D04H 3/004* (2013.01); *D04H 3/007* (2013.01); *D04H 3/009* (2013.01); *D04H 3/045* (2013.01); *D04H 3/115* (2013.01); *D04H 3/12* (2013.01); *Y10T 29/49732* (2015.01); *Y10T 428/23914* (2015.04); *Y10T 428/24033* (2015.01); *Y10T 428/2462* (2015.01); *Y10T 428/2476* (2015.01); *Y10T 428/24322* (2015.01); *Y10T 428/24562* (2015.01); *Y10T 428/24603* (2015.01); *Y10T 428/24744* (2015.01); *Y10T 428/24818* (2015.01)

(58) Field of Classification Search
None
See application file for complete search history.

(56) References Cited

U.S. PATENT DOCUMENTS

| | | | |
|---|---|---|---|
| 2,961,738 | A | 11/1960 | Thomas |
| 3,620,701 | A | 11/1971 | Janetos et al. |
| (Continued) | | | |

*Primary Examiner* — Jeffry H Aftergut
*Assistant Examiner* — Jaeyun Lee

(57) ABSTRACT

A novel reinforcement system for maximizing tensile strength and modulus of elasticity per ply for composite systems has one or more pockets with a first pocket edge, a second pocket edge, a pocket front surface, and a pocket rear surface. The pocket front surface and the pocket rear surface each have a pocket cross-stitch that perpendicularly traverses the pocket. The pocket traverses the fabric parallel and adjacent to the first fabric edge and the second fabric edge in a warp, or 0 degree, or x-axis direction. The pockets contain one or more fiber tows with a plurality of filaments in a stack.

15 Claims, 11 Drawing Sheets

Related U.S. Application Data continuation of application No. 13/333,910, filed on Dec. 21, 2011, now Pat. No. 8,696,849.

(60) Provisional application No. 61/425,949, filed on Dec. 22, 2010.

(56) References Cited

U.S. PATENT DOCUMENTS

| | | |
|---|---|---|
| 3,903,714 A | 9/1975 | Horeni et al. |
| 4,052,866 A | 10/1977 | Saunders |
| 4,079,568 A * | 3/1978 | Wortman ............... A41D 31/02 428/292.1 |
| 4,931,345 A | 6/1990 | Bottger et al. |
| 5,118,569 A | 6/1992 | Kuroda et al. |
| 5,198,280 A | 3/1993 | Harpell et al. |
| 6,843,194 B1 | 1/2005 | Baudet |
| 8,696,849 B2 | 4/2014 | Butler |
| 9,307,796 B2 * | 4/2016 | Butler .................... B29C 70/30 |

* cited by examiner

REINFORCEMENT SYSTEM

CROSS REFERENCE

This application claims priority to U.S. Non-Provisional application Ser. No. 14/186,571 filed Feb. 21, 2014 as a continuation, claims priority to U.S. Non-Provisional application Ser. No. 13/333,910 filed Dec. 21, 2011 now U.S. Pat. No. 8,696,849, and to U.S. provisional application Ser. No. 61/425,949 filed Dec. 22, 2010, the specification(s) of which is/are incorporated herein by reference in its entirety.

BACKGROUND OF THE INVENTION

Carbon fiber reinforced polymer is a strong and lightweight system that can be used as a material of construction or a system of repair with its origins in the late 1950s. Carbon fiber consists mostly of carbon atoms bonded together in crystals that are basically aligned parallel to form a long axis giving the fiber very high strength to weight properties. Carbon fibers are usually combined with other materials, such as polymers, to form a composite. Carbon fiber composite materials combine the very high strength-to-weight properties of the carbon fiber with a versatile polymer matrix to utilize the unique properties in fabrication and repair applications.

SUMMARY

The present invention features a novel reinforcement system for maximizing tensile strength and modulus of elasticity per ply for composite systems.

In some embodiments, the fabric has one or more pockets with a first pocket edge, a second pocket edge, a pocket front surface, and a pocket rear surface. In some embodiments, the pocket front surface and the pocket rear surface each has a pocket cross-stitch that perpendicularly traverses the pocket. In some embodiments, the pocket traverses the fabric parallel and adjacent to the first fabric edge and the second fabric edge in a warp, or 0 degree, or x-axis direction. In some embodiments, the pocket contains one or more fiber tows with a plurality of filaments in a stack.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
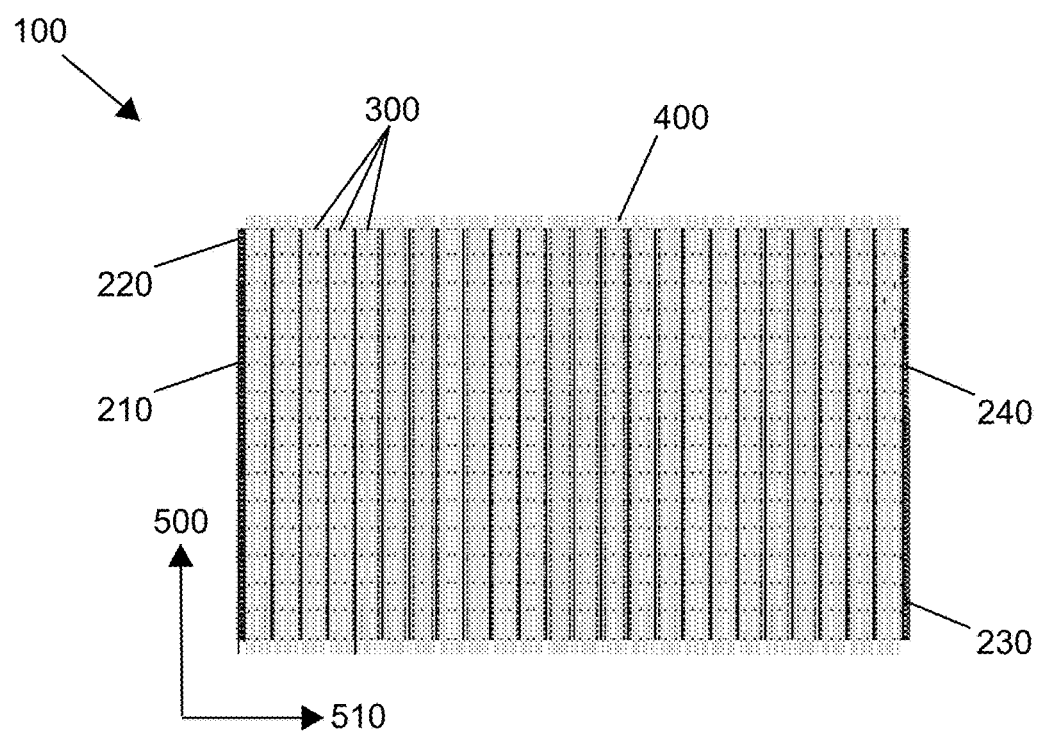
FIG. 1 is a top view of the fabric of the present invention.
Figure 2:
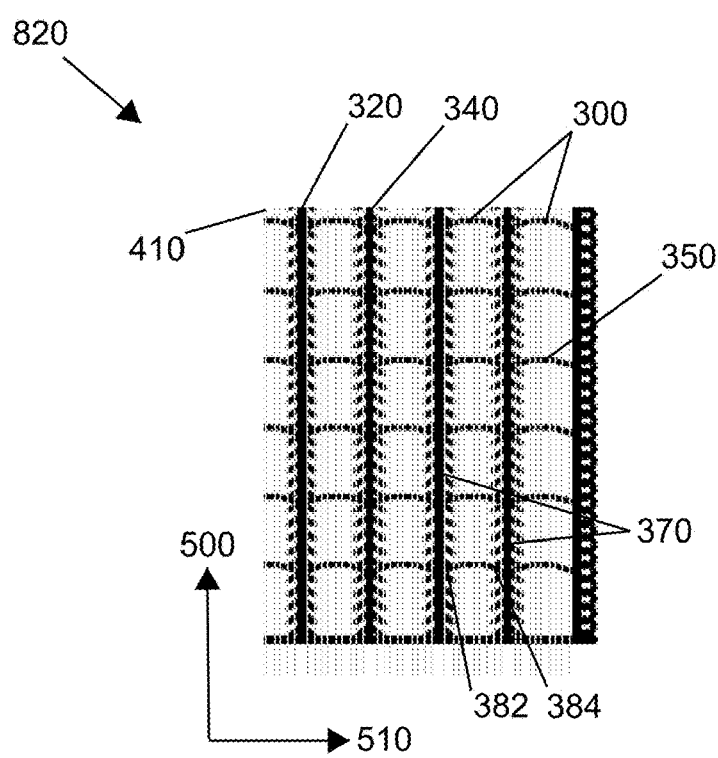
FIG. 2 is a close-up view of the reinforcement system of the present invention.
Figure 3:
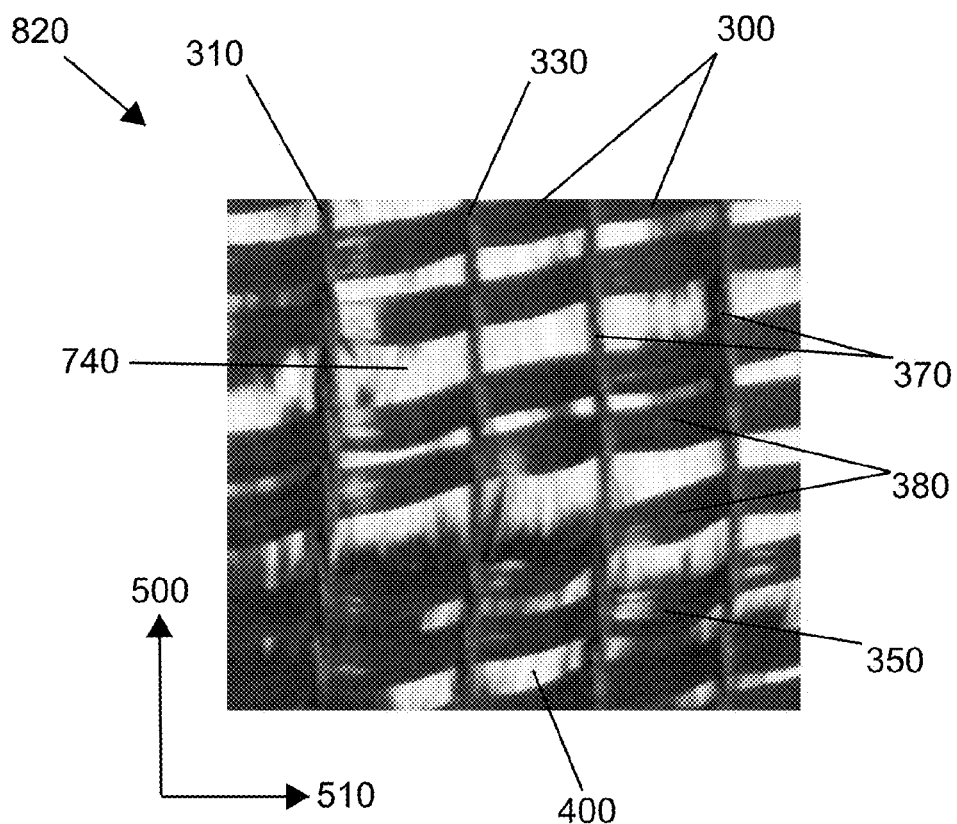
FIG. 3 is a close-up view of the reinforcement system of the present invention.
Figure 4:
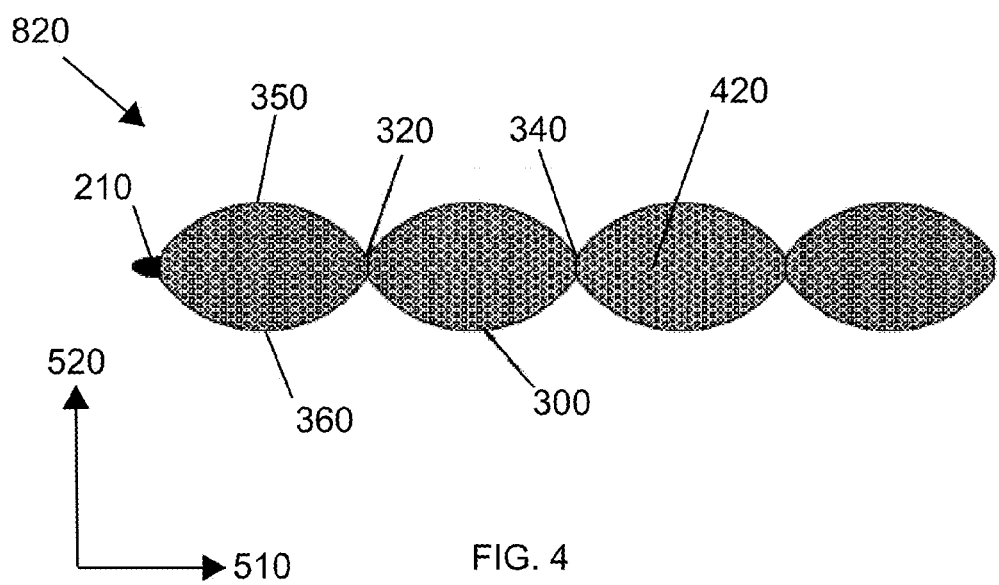
FIG. 4 is a cross-sectional view of the reinforcement system of the present invention.
Figure 5:
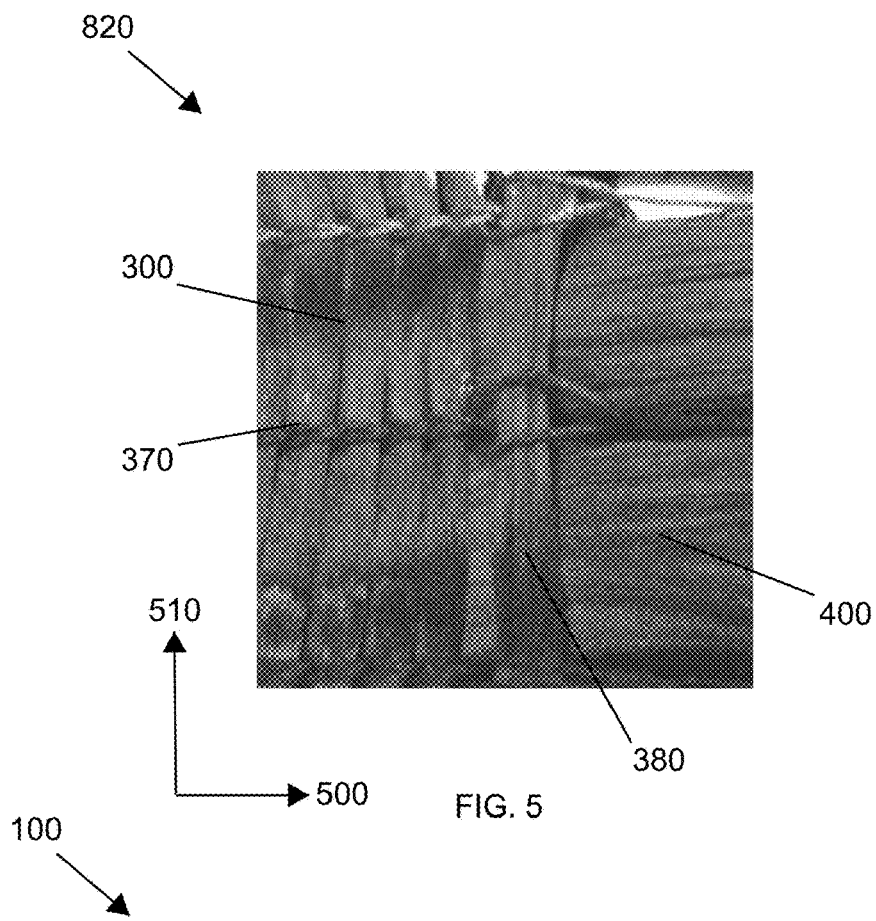
FIG. 5 is a close-up view of the reinforcement system of the present invention.
Figure 6:
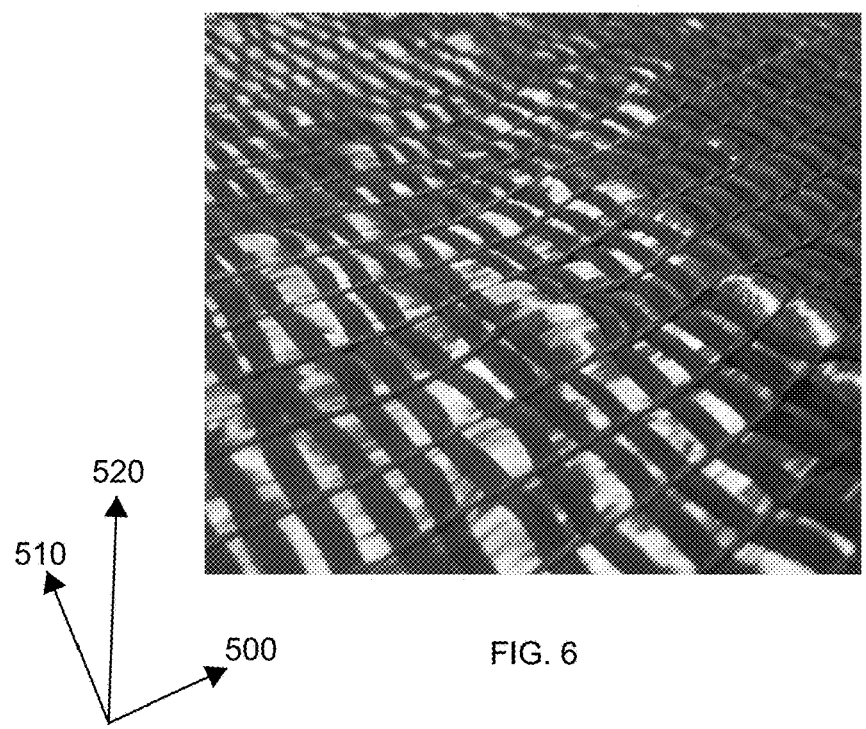
FIG. 6 is a perspective view of the fabric of the present invention.
Figure 7:
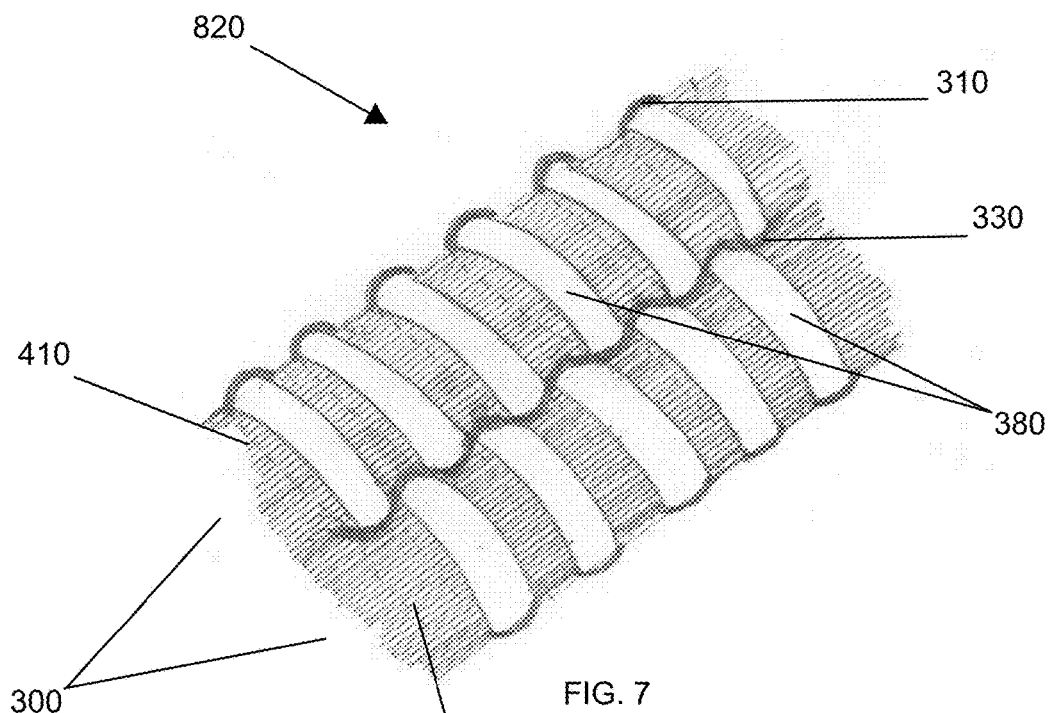
FIG. 7 is a close-up view of the reinforcement system of the present invention.
Figure 8:
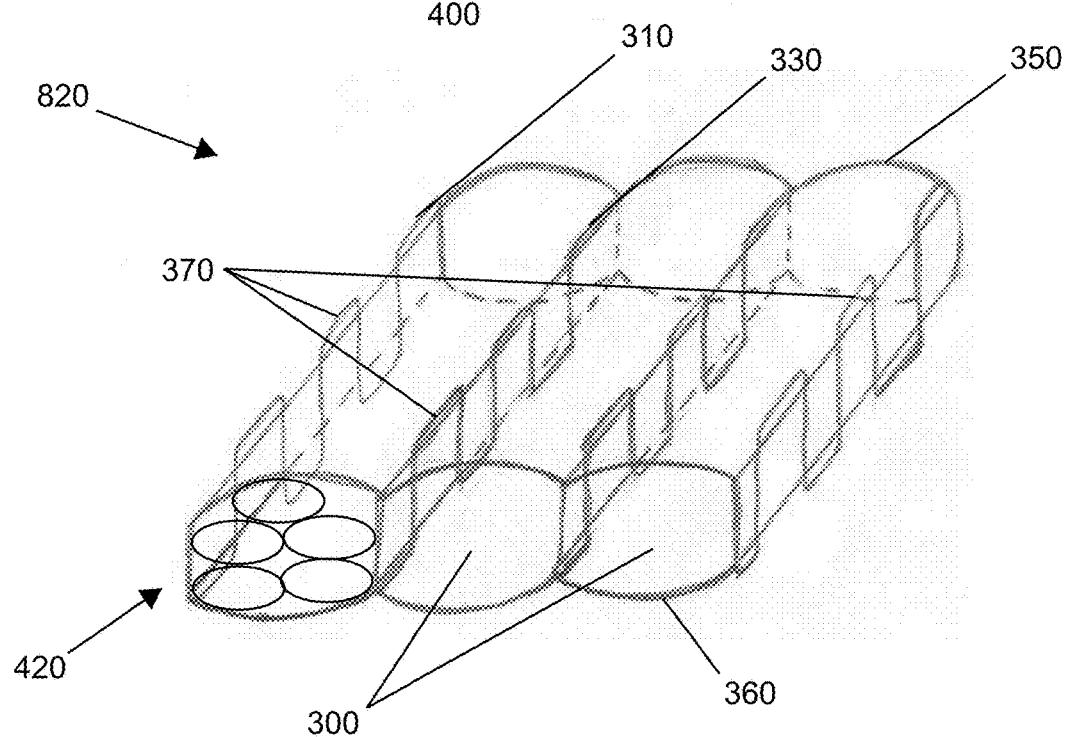
FIG. 8 is a perspective cross-sectional view of the reinforcement system of the present invention.
Figure 9:
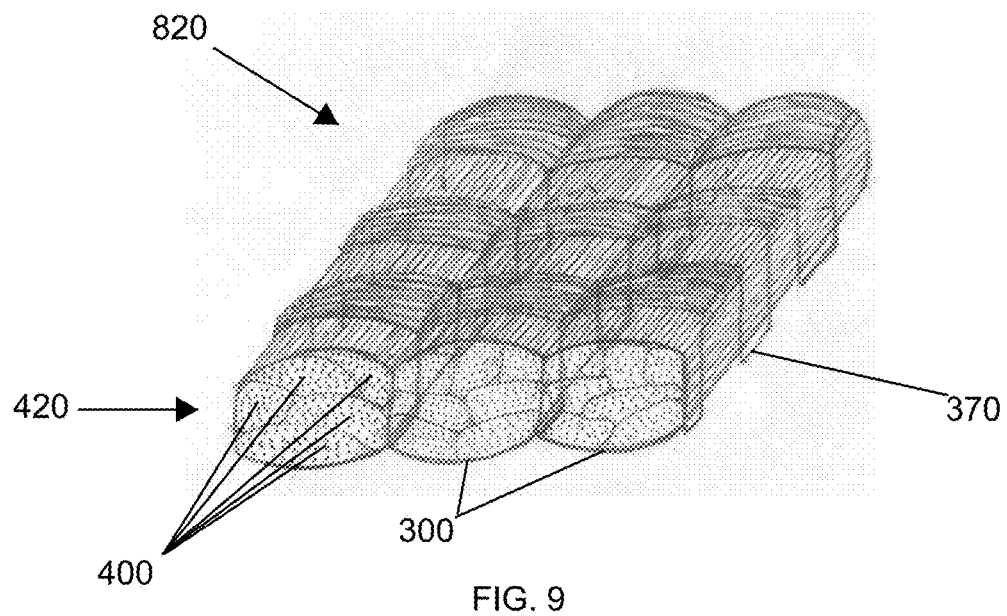
FIG. 9 is a perspective cross-sectional view of the reinforcement system of the present invention.
Figure 10:
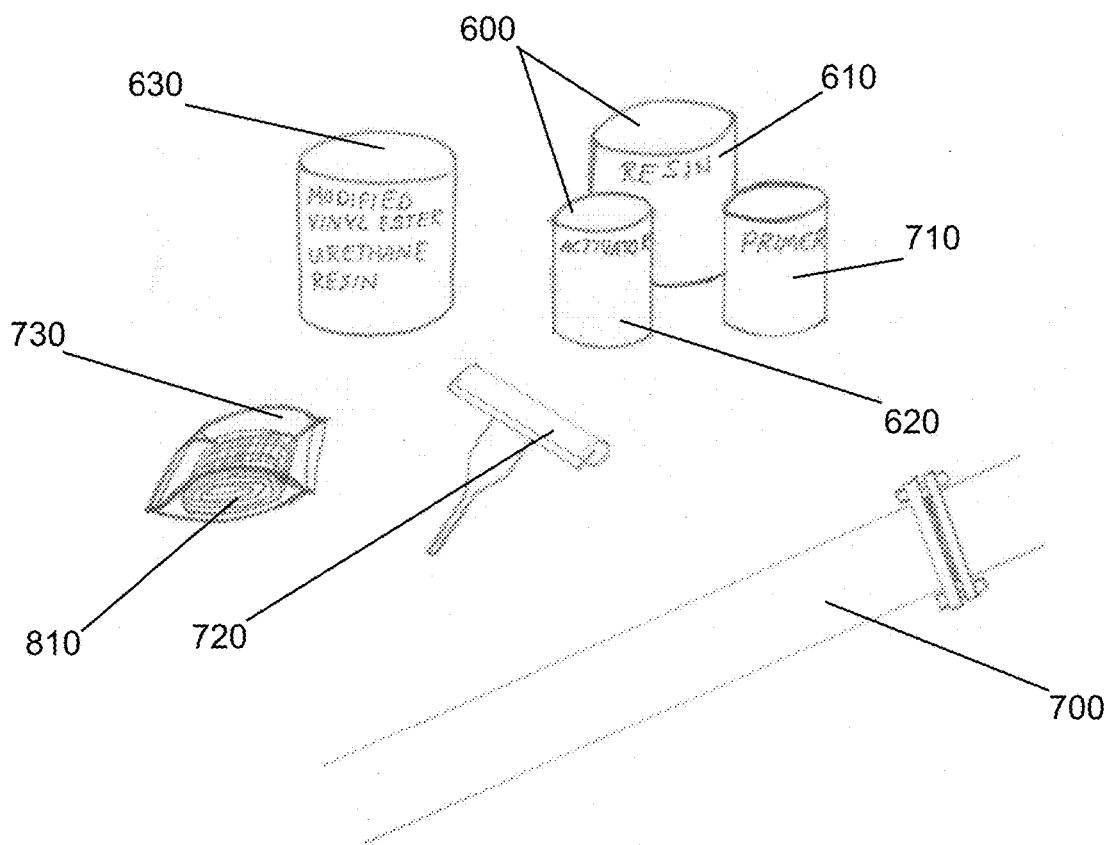
FIG. 10 is a view of the structural repair and reinforcement system of the present invention.
Figure 11A:
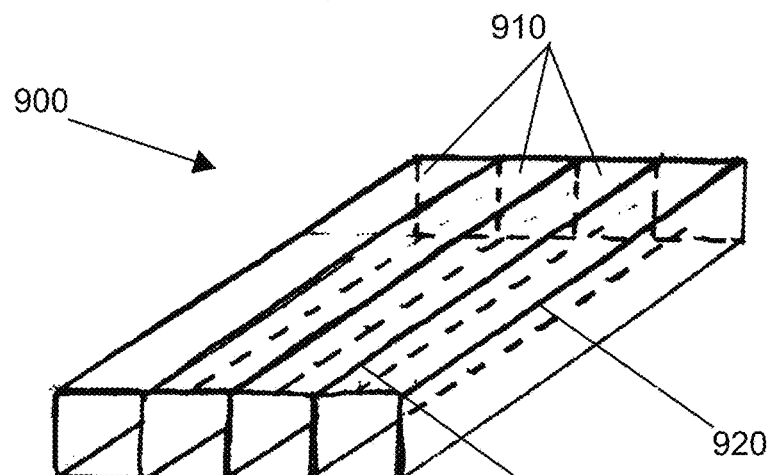
FIG. 11A-11C is a perspective view of embodiments of the housing matrix.
Figure 11B:
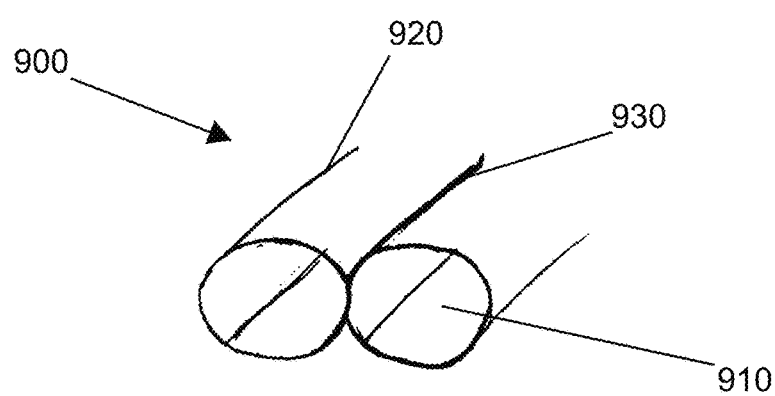
Figure 11C:
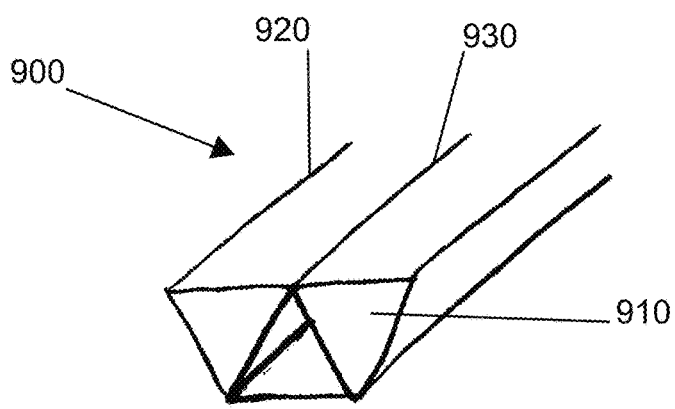
Figure 12A:
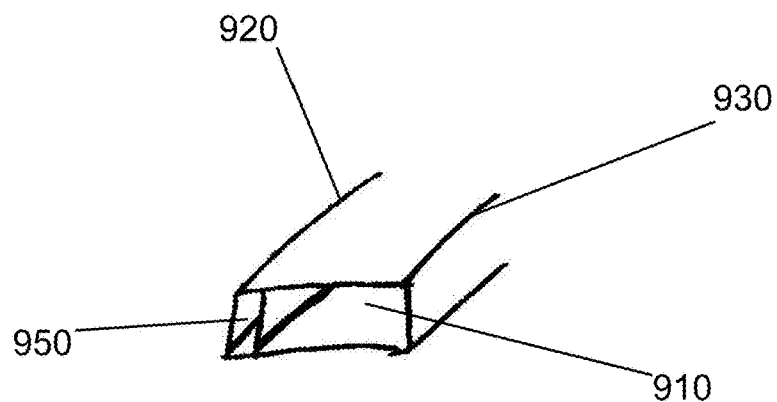
FIG. 12A-12M is a perspective view of embodiments of the channel.
Figure 12B:
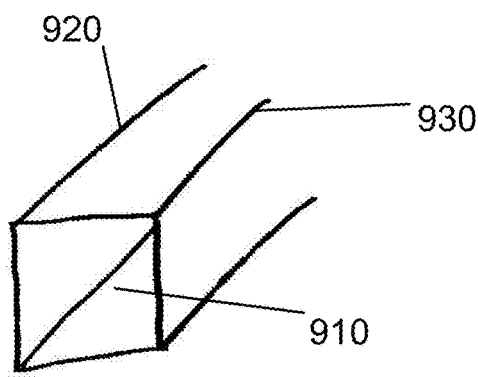
Figure 12C:
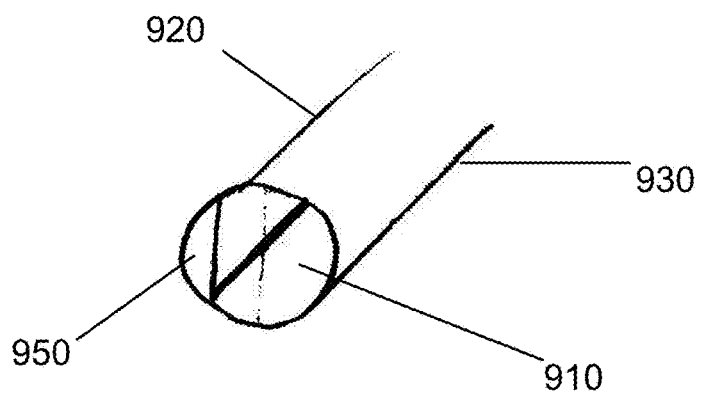
Figure 12D:
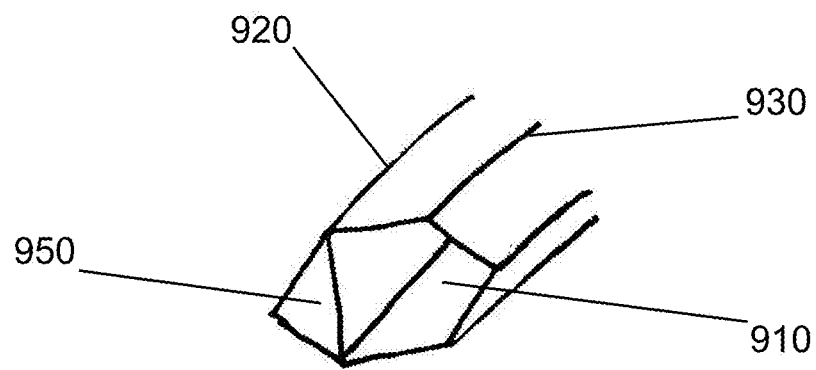
Figure 12E:
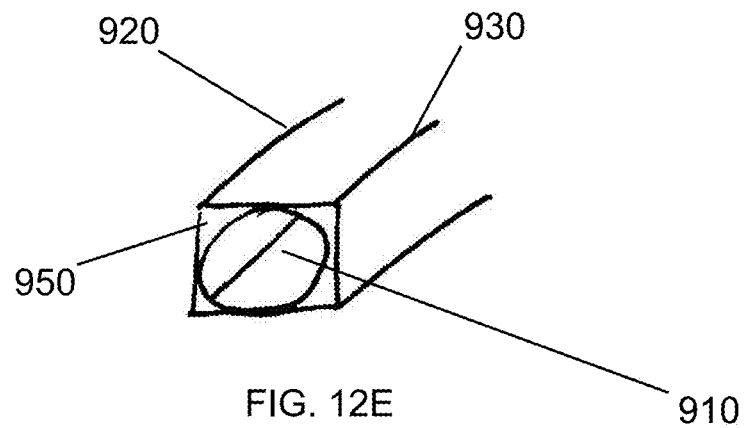
Figure 12F:
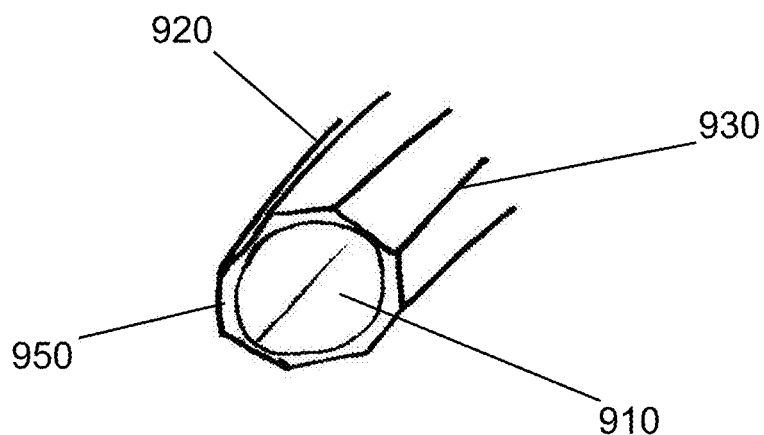
Figure 12G:
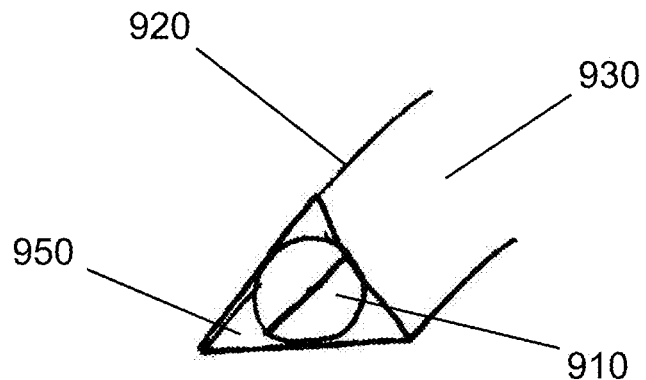
Figure 12H:
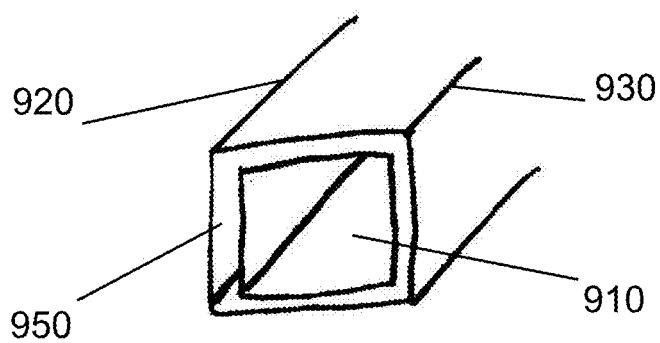
Figure 12I:
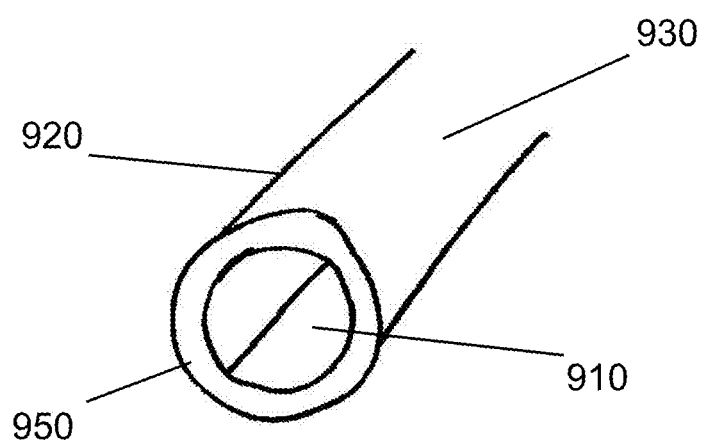
Figure 12J:
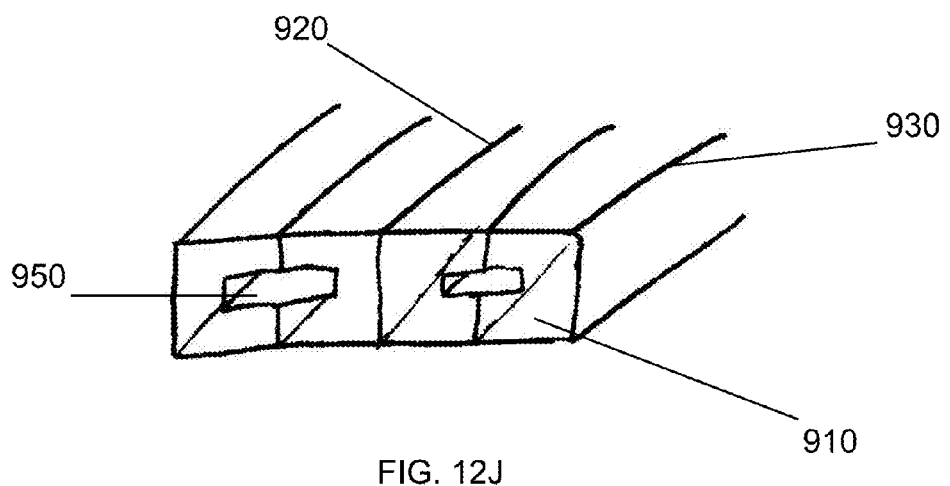
Figure 12K:
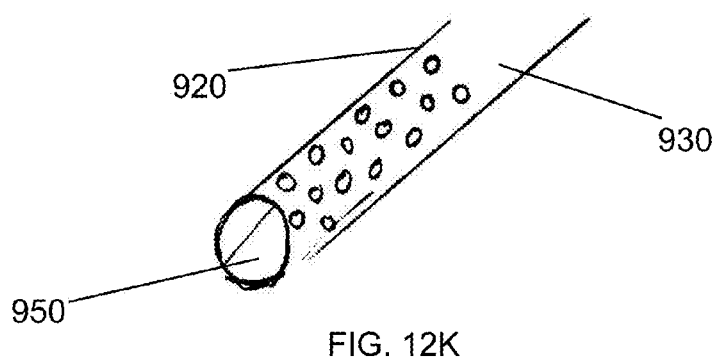
Figure 12L:
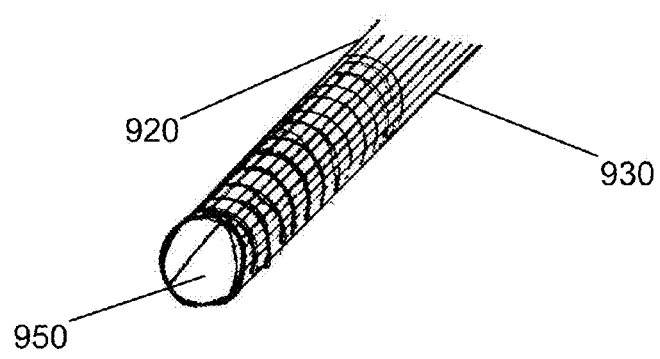
Figure 12M:
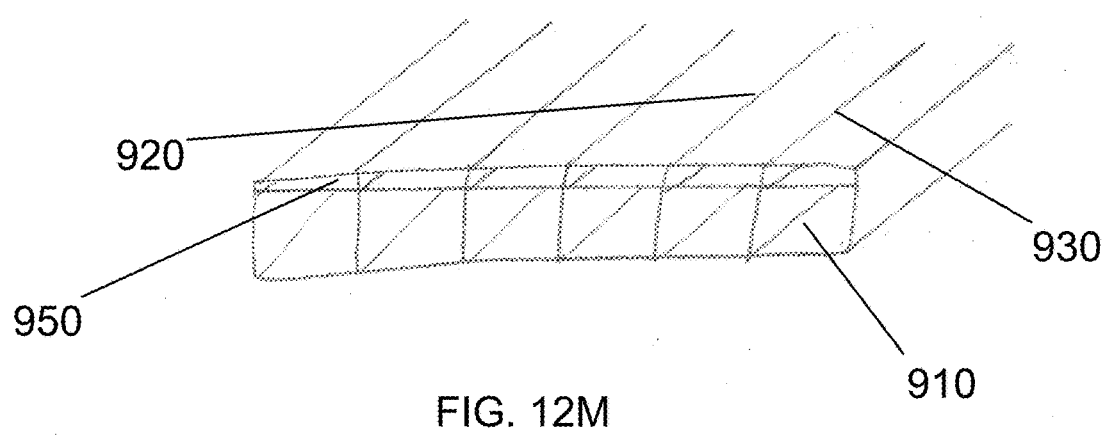

Following is a list of elements corresponding to a particular element referred to herein:
100 Reinforcement fabric
210 First fabric edge seam
220 First fabric edge
230 Second fabric edge seam
240 Second fabric edge
300 Pocket
310 First pocket seam
320 First pocket edge
330 Second pocket seam
340 Second pocket edge
350 Pocket front surface
360 Pocket rear surface
370 Stitching
380 Pocket cross-stitch
382 Stitch first end
384 Stitch second end
400 Fiber tow
410 Filament
420 Stack
500 X-axis (0 degrees)
510 Y-axis or 90 degrees
520 Z-axis
600 Polymer resin composition
610 Resin component
620 Activation component
630 Modified vinyl ester resin composition
700 Substrate
710 Low-viscosity epoxy primer
720 Roller
730 Packaging
740 Open area
800 Structural repair and reinforcement system
810 Preimpregnated structural repair and reinforcement system
820 Reinforcement system
900 Reinforcement fiber housing matrix
910 Channel
920 First channel side
930 Second channel side
950 Sub-channel
Novel Reinforcement System Referring now to FIG. 1-12M, the present invention features a novel reinforcement fabric (100) system for maximizing tensile strength and modulus of elasticity per ply for composite systems. In some embodiments, this is measured in pounds/inch/width.

In some embodiments, the fabric (100) has a first fabric edge seam (210) located on a first fabric edge (220), and a second fabric edge seam (230) located on a second fabric edge (240). In some embodiments, the first fabric edge seam (210) traverses and binds the fabric (100) parallel and adjacent to the first fabric edge (220), and the second fabric edge seam (230) traverses and binds the fabric (100) parallel to and adjacent to the second fabric edge (240). In some embodiments, the first fabric edge (220) and second fabric edge (240) traverse the fabric (100) in the direction of an X-axis (0 degrees) (500).

In some embodiments, the fabric (100) has a pocket (300) with a first pocket edge (320), a second pocket edge (340), a pocket front surface (350), and a pocket rear surface (360). In some embodiments, the pocket (300) has a first pocket seam (310) located on the first pocket edge (320). In some embodiments, the first pocket seam (310) has a stitching (370) in a plane defined by the X-axis (0 degrees) (500) and a Z-axis (520) alternatingly attaching the pocket front surface (350) to the pocket rear surface (360) via the stitching (370). In some embodiments, the first pocket seam (310) traverses the fabric (100) parallel and adjacent to the first pocket edge (320).

In some embodiments, the pocket (300) has a second pocket seam (330) located on the second pocket edge (340). In some embodiments, the second pocket seam (330) has a stitching (370) in a plane defined by the X-axis (0 degrees) (500) and the Z-axis (520) alternatingly attaching the pocket front surface (350) to the pocket rear surface (360) via the stitching (370). In some embodiments, the second pocket seam (330) traverses the fabric (100) parallel and adjacent to the second pocket edge (340).

In some embodiments, the pocket front surface (350) has a pocket cross-stitch (380) that perpendicularly traverses the pocket (300) with respect to the first pocket seam (310) and the second pocket seam (330) in a direction of a Y-axis or 90 degrees (510). In some embodiments, the pocket rear surface (360) has a pocket cross-stitch (380) that perpendicularly traverses the pocket (300) with respect to the first pocket seam (310) and the second pocket seam (330) in the direction of the Y-axis or 90 degrees (510).

In some embodiments, the pocket cross-stitch (380) has a stitch first end (382) attached to the first pocket seam (310) and a stitch second end (384) attached to the second pocket seam (330).

In some embodiments, the pocket (300) traverses the fabric (100) parallel and adjacent to the first fabric edge (220) and the second fabric edge (240) in a warp, or 0 degree, or X-axis (500) direction.

In some embodiments, the fabric (100) has a fiber tow (400) with a plurality of filaments (410) located in a stack (420). In some embodiments, the fiber tow (400) is located lengthways in the direction of the X-axis (0 degrees) (500) in the pocket (300).

In some embodiments, the filament (410) is constructed from a material selected from a group consisting of: polyethylene, glass, basalt, aramid, and carbon.

In some embodiments, a plurality of pockets (300) is located in parallel in a series. In some embodiments, a first pocket edge (320) of a first pocket (300) is joined to a second pocket edge (340) of a second pocket (300). In some embodiments, a plurality of pockets (300) is joined in parallel in a series at the first pocket edge (320) and the second pocket edge (340) of each pocket (300) in the series.

In some embodiments, the pocket (300) is located in a weft, or 90 degree, or Y-axis (510) direction with respect to the first fabric edge (220) and the second fabric edge (240).

In some embodiments, the fiber tow (400) has from about 1 filament (410) to about 3,000 filaments (410). In some embodiments, the fiber tow (400) has from about 3,000 filaments (410) to about 6,000 filaments (410). In some embodiments, the fiber tow (400) has from about 6,000 filaments (410) to about 12,000 filaments (410). In some embodiments, the fiber tow (400) has from about 12,000 filaments (410) to about 50,000 filaments (410). In some embodiments, the fiber tow (400) has more than about 50,000 filaments (410). In some embodiments, the fiber tow (400) has more than about 400,000 filaments (410).

In some embodiments, the cross-sectional area of the stacks (420) is about 50% to 70% of the cross-sectional area of the pocket (300). In some embodiments, the cross-sectional area of the stacks (420) is about 70% to 85% of the cross-sectional area of the pocket (300). In some embodiments, the cross-sectional area of the stacks (420) is about 85% to 99.5% of the cross-sectional area of the pocket (300).

In some embodiments, the volume of the stacks (420) in the pocket (300) is about 50% to 70% of the volume of the pocket (300). In some embodiments, the volume of the stacks (420) in the pocket (300) is about 70% to 85% of the volume of the pocket (300). In some embodiments, the volume of the stacks (420) in the pocket (300) is about 85% to 99.5% of the volume of the pocket (300).

In some embodiments, the fiber tow (400) has a plurality of non-interlaced filaments (410). In some embodiments, the fiber tow (400) has a plurality of interlaced filaments (410). In some embodiments, the fiber tow (400) has a plurality of non-twisted filaments (410). In some embodiments, the fiber tow (400) has a plurality of twisted filaments (410).

In some embodiments, the fiber tow (400) has a plurality of filaments (410) located one upon another forming a generally elliptical cross-section of the fiber tow (400) located in the pocket (300).

In some embodiments, the pocket front surface (350) has an open area (740) greater than 50%. In some embodiments, the open area (740) has an area wherein filaments (410) are exposed between a plurality of pocket cross-stitches (380) of the pocket front surface (350).

In some embodiments, the pocket rear surface (360) has an open area (740) greater than 50%. In some embodiments, the open area (740) has an area wherein filaments (410) are exposed between a plurality of pocket cross-stitches (380) of the pocket rear surface (360).

In some embodiments, the fabric (100) is electrically conductive. In some embodiments, the fabric (100) contains a heating element. In some embodiments, the fabric (100) contains a resistance wire, ribbon, or strip. In some embodiments, the fabric (100) is attached to a regulated power supply. In some embodiments, the fabric (100) is operatively attached to a regulated power supply to power the heating element of the fabric (100) to a controlled temperature using Joule heating. In some embodiments, the heated fabric (100) can be used to activate a modified vinyl ester resin composition (630). In some embodiments, the heated fabric (100) can be used to activate a resin composition.

In some embodiments, the thread used for the first fabric edge seam (210), second fabric edge seam (230), first pocket seam (310), second pocket seam (330), stitching (370), and pocket cross-stitch (380) are manufactured from a polyester.

In some embodiments, Low-viscosity epoxy primer (710) measures between about 200 and 800 centipoise (cP).

In some embodiments, the roller (720) is a nap roller (720).

In some embodiments, air-tight packaging (730) includes vacuum sealed packaging (730).

Structural Repair and Reinforcement System

In some embodiments, a structural repair and reinforcement system (800) for maximizing tensile strength and modulus of elasticity per ply via composite technology has a ply of reinforcement fabric (100). In some embodiments, the fabric (100) has a first fabric edge seam (210) located on a first fabric edge (220), and a second fabric edge seam (230) located on a second fabric edge (240). In some embodiments, the first fabric edge seam (210) traverses and binds the fabric (100) parallel and adjacent to the first fabric edge (220), and the second fabric edge seam (230) traverses and binds the fabric (100) parallel to and adjacent to the second fabric edge (240). In some embodiments, the first fabric edge (220) and second fabric edge (240) traverse the fabric (100) in the direction of an X-axis (0 degrees) (500).

In some embodiments, the fabric (100) has a pocket (300) with a first pocket edge (320), a second pocket edge (340), a pocket front surface (350), and a pocket rear surface (360). In some embodiments, the pocket (300) has a first pocket seam (310) located on the first pocket edge (320). In some embodiments, the first pocket seam (310) has a stitching (370) in a plane defined by the X-axis (0 degrees) (500) and a Z-axis (520) alternatingly attaching the pocket front surface (350) to the pocket rear surface (360) via the stitching (370). In some embodiments, the first pocket seam (310) traverses the fabric (100) parallel and adjacent to the first pocket edge (320).

In some embodiments, the pocket (300) has a second pocket seam (330) located on the second pocket edge (340). In some embodiments, the second pocket seam (330) has a stitching (370) in a plane defined by the X-axis (0 degrees) (500) and the Z-axis (520) alternatingly attaching the pocket front surface (350) to the pocket rear surface (360) via the stitching (370). In some embodiments, the second pocket seam (330) traverses the fabric (100) parallel and adjacent to the second pocket edge (340).

In some embodiments, the pocket front surface (350) has a pocket cross-stitch (380) that perpendicularly traverses the pocket (300) with respect to the first pocket seam (310) and the second pocket seam (330) in a direction of a Y-axis or 90 degrees (510). In some embodiments, the pocket rear surface (360) has a pocket cross-stitch (380) that perpendicularly traverses the pocket (300) with respect to the first pocket seam (310) and the second pocket seam (330) in the direction of the Y-axis or 90 degrees (510).

In some embodiments, the pocket cross-stitch (380) has a stitch first end (382) attached to the first pocket seam (310) and a stitch second end (384) attached to the second pocket seam (330).

In some embodiments, the pocket (300) traverses the fabric (100) parallel and adjacent to the first fabric edge (220) and the second fabric edge (240) in a warp, or 0 degree, or X-axis (500) direction.

In some embodiments, the pocket (300) has a fiber tow (400) with a plurality of filaments (410) located in a stack (420). In some embodiments, the fiber tow (400) is located lengthways in the direction of the X-axis (0 degrees) (500) in the pocket (300).

In some embodiments, the filament (410) is constructed from a material selected from a group consisting of: polyethylene, glass, basalt, aramid, and carbon.

In some embodiments, a plurality of pockets (300) is located in parallel in a series. In some embodiments, a first pocket edge (320) of a first pocket (300) is joined to a second pocket edge (340) of a second pocket (300). In some embodiments, a plurality of pockets (300) is joined in parallel in a series at the first pocket edge (320) and the second pocket edge (340) of each pocket (300) in the series.

In some embodiments, a structural repair and reinforcement system (800) for maximizing tensile strength and modulus of elasticity per ply via composite technology has a polymer resin composition (600). In some embodiments, the polymer resin composition (600) has a resin component (610) and an activation component (620).

In some embodiments, the structural repair and reinforcement system (800) is stored until installed by an end user.

Structural Repair and Reinforcement System Via Preimpregnated Composite Technology In some embodiments, A preimpregnated structural repair and reinforcement system (810) for maximizing tensile strength and modulus of elasticity per ply via preimpregnated composite technology has a ply of reinforcement fabric (100). In some embodiments, the fabric (100) has a first fabric edge seam (210) located on a first fabric edge (220), and a second fabric edge seam (230) located on a second fabric edge (240). In some embodiments, the first fabric edge seam (210) traverses and binds the fabric (100) parallel and adjacent to the first fabric edge (220), and the second fabric edge seam (230) traverses and binds the fabric (100) parallel to and adjacent to the second fabric edge (240). In some embodiments, the first fabric edge (220) and second fabric edge (240) traverse the fabric (100) in the direction of an X-axis (0 degrees) (500).

In some embodiments, the reinforcement fabric (100) has a pocket (300) with a first pocket edge (320), a second pocket edge (340), a pocket front surface (350), and a pocket rear surface (360). In some embodiments, the pocket (300) has a first pocket seam (310) located on the first pocket edge (320). In some embodiments, the first pocket seam (310) has a stitching (370) in a plane defined by the X-axis (0 degrees) (500) and a Z-axis (520) alternatingly attaching the pocket front surface (350) to the pocket rear surface (360) via the stitching (370). In some embodiments, the first pocket seam (310) traverses the fabric (100) parallel and adjacent to the first pocket edge (320).

In some embodiments, the pocket (300) has a second pocket seam (330) located on the second pocket edge (340). In some embodiments, the second pocket seam (330) has a stitching (370) in a plane defined by the X-axis (0 degrees) (500) and the Z-axis (520) alternatingly attaching the pocket front surface (350) to the pocket rear surface (360) via the stitching (370). In some embodiments, the second pocket seam (330) traverses the fabric (100) parallel and adjacent to the second pocket edge (340).

In some embodiments, the pocket front surface (350) has a pocket cross-stitch (380) that perpendicularly traverses the pocket (300) with respect to the first pocket seam (310) and the second pocket seam (330) in a direction of a Y-axis or 90 degrees (510). In some embodiments, the pocket rear surface (360) has pocket cross-stitch (380) that perpendicularly traverses the pocket (300) with respect to the first pocket seam (310) and the second pocket seam (330) in the direction of the Y-axis or 90 degrees (510).

In some embodiments, the pocket cross-stitch (380) has a stitch first end (382) attached to the first pocket seam (310) and a stitch second end (384) attached to the second pocket seam (330).

In some embodiments, the pocket (300) traverses the fabric (100) parallel and adjacent to the first fabric edge (220) and the second fabric edge (240) in a warp, or 0 degree, or X-axis (500) direction.

In some embodiments, the pocket has a fiber tow (400) with a plurality of filaments (410) located in a stack (420). In some embodiments, the fiber tow (400) is located lengthways in the direction of the X-axis (0 degrees) (500) in the pocket (300).

In some embodiments, the filament (410) is constructed from a material selected from a group consisting of: polyethylene, glass, basalt, aramid, and carbon.

In some embodiments, a preimpregnated structural repair and reinforcement system (810) for maximizing tensile strength and modulus of elasticity per ply via preimpregnated composite technology has a modified vinyl ester resin composition (630) located (or preimpregnated) on the reinforcement fabric (100). In some embodiments, the modified vinyl ester resin composition (630) is cross-linked with urethane. In some embodiments, the modified vinyl ester resin composition (630) is cross-linked with another compound. In some embodiments, a modified vinyl ester resin composition is available as DION® 31038-00 that can be purchased from Reichhold (http://www.reichhold.com/en/composites-products.aspx?cat=Brands&pid=14) as of Dec. 21, 2011.

In some embodiments, the system (810) is stored until installed by an end user. In some embodiments, the system (810) has a shelf life of six months. In some embodiments, the system (810) can be stored in an environment having temperatures about ambient. In some embodiments, ambient temperature is less than about 60 degrees Fahrenheit. In some embodiments ambient temperature is about 60 degrees Fahrenheit to about 80 degrees Fahrenheit. In some embodiments, ambient temperature is about 80 degrees Fahrenheit to about 100 degrees Fahrenheit. In some embodiments, ambient temperature is greater than 100 degrees Fahrenheit. In some embodiments, the system (810) has air-tight packaging (730).

In some embodiments, the system (810) is activated for curing upon raising the temperature of the system (810) to about 275 degrees Fahrenheit for about 15 minutes. In some embodiments, the system (810) is activated for curing via exposure to water.

Structural Repair and Reinforcement Method

In some embodiments, a method for maximizing tensile strength and modulus of elasticity per ply in a reinforcement or repair operation via composite technology includes obtaining a structural repair and reinforcement system (800).

In some embodiments, the system (800) has a ply of reinforcement fabric (100) having a first fabric edge seam (210) located on a first fabric edge (220), and a second fabric edge seam (230) located on a second fabric edge (240). In some embodiments, the first fabric edge seam (210) traverses and binds the fabric (100) parallel and adjacent to the first fabric edge (220), and the second fabric edge seam (230) traverses and binds the fabric (100) parallel to and adjacent to the second fabric edge (240). In some embodiments, the first fabric edge (220) and second fabric edge (240) traverse the fabric (100) in the direction of an X-axis (0 degrees) (500).

In some embodiments, the fabric (100) has a pocket (300) with a first pocket edge (320), a second pocket edge (340), a pocket front surface (350), and a pocket rear surface (360). In some embodiments, the pocket (300) has a first pocket seam (310) located on the first pocket edge (320). In some embodiments, the first pocket seam (310) has a stitching (370) in a plane defined by the X-axis (0 degrees) (500) and a Z-axis (520) alternatingly attaching the pocket front surface (350) to the pocket rear surface (360) via the stitching (370). In some embodiments, the first pocket seam (310) traverses the fabric (100) parallel and adjacent to the first pocket edge (320).

In some embodiments, the pocket (300) has a second pocket seam (330) located on the second pocket edge (340). In some embodiments, the second pocket seam (330) having a stitching (370) in a plane defined by the X-axis (0 degrees) (500) and the Z-axis (520) alternatingly attaching the pocket front surface (350) to the pocket rear surface (360) via the stitching (370). In some embodiments, the second pocket seam (330) traverses the fabric (100) parallel and adjacent to the second pocket edge (340).

In some embodiments, the pocket front surface (350) has pocket cross-stitch (380) that perpendicularly traverses the pocket (300) with respect to the first pocket seam (310) and the second pocket seam (330) in a direction of a Y-axis or 90 degrees (510). In some embodiments, the pocket rear surface (360) has a pocket cross-stitch (380) that perpendicularly traverses the pocket (300) with respect to the first pocket seam (310) and the second pocket seam (330) in the direction of the Y-axis or 90 degrees (510).

In some embodiments, the pocket cross-stitch (380) has a stitch first end (382) attached to the first pocket seam (310) and a stitch second end (384) attached to the second pocket seam (330).

In some embodiments, the pocket (300) traverses the fabric (100) parallel and adjacent to the first fabric edge (220) and the second fabric edge (240) in a warp, or 0 degree, or X-axis (500) direction.

In some embodiments, the fabric (100) has a fiber tow (400) with a plurality of filaments (410) located in a stack (420). In some embodiments, the fiber tow (400) is located lengthways in the direction of the X-axis (0 degrees) (500) in the pocket (300).

In some embodiments, the filament (410) is constructed from a material selected from a group consisting of: polyethylene, glass, basalt, aramid, and carbon.

In some embodiments, a plurality of pockets (300) is located in parallel in a series. In some embodiments, a first pocket edge (320) of a first pocket (300) is joined to a second pocket edge (340) of a second pocket (300). In some embodiments, a plurality of pockets (300) is joined in parallel in a series at the first pocket edge (320) and the second pocket edge (340) of each pocket (300) in the series.

In some embodiments, the system (800) has a polymer resin composition (600) with a resin component (610) and an activation component (620).

In some embodiments, the structural repair and reinforcement system (800) is stored until installed by an end user.

In some embodiments, a method for maximizing tensile strength and modulus of elasticity per ply in a reinforcement or repair operation via composite technology includes preparing a substrate (700) for application via cleaning the substrate (700). In some embodiments, loose particles, scale, surface oxidation, and oily films are removed via physical abrasion or power washing.

In some embodiments, a method for maximizing tensile strength and modulus of elasticity per ply in a reinforcement or repair operation via composite technology includes preparing a substrate (700) for application via priming the substrate (700) with a low-viscosity epoxy primer (710). In some embodiments, the primer (710) is applied to the substrate (700) via a roller (720).

In some embodiments, a method for maximizing tensile strength and modulus of elasticity per ply in a reinforcement or repair operation via composite technology includes preparing the polymer resin composition (600) for application via combining the resin component (610) and the activation component (620) in a specified ratio.

Wet Layup Option

In some embodiments, a wet layup method for maximizing tensile strength and modulus of elasticity per ply in a reinforcement or repair operation via composite technology includes preparing a substrate (700) for application via high pressure water or abrasion. In some embodiments, a primer is applied to assist bond adhesion. In some embodiments, to assist installation, a tack or thickened paste is applied to assist installation. In some embodiments, the tack coat consists of the polymer resin composition (600). In some embodiments, the tack coat is applied to the substrate (700) via the roller or trowel (720). In some embodiments, a method for maximizing tensile strength and modulus of elasticity per ply in a reinforcement or repair operation via composite technology includes applying a saturating quantity of the resin composition (600) to the surface of the reinforcement fabric (100). In some embodiments, the resin composition (600) is applied to the substrate (700) via the roller (720). In some embodiments, the resin composition (600) is applied to the reinforcement fabric (100) via a saturation machine. In some embodiments, a method for maximizing tensile strength and modulus of elasticity per ply in a reinforcement or repair operation via composite technology includes laying a ply of reinforcement fabric (100) on the prepared substrate (700). In some embodiments, the ply of reinforcement fabric (100) is laid in a direction wherein the pocket (300) direction linearly traverses the hoop direction of a pipe or other substrate.

Dry Layup Option

In some embodiments, a dry layup method for maximizing tensile strength and modulus of elasticity per ply in a reinforcement or repair operation via composite technology includes laying a ply of reinforcement fabric (100) on the prepared substrate (700). In some embodiments, the ply of reinforcement fabric (100) is laid in a direction wherein the pocket (300) direction linearly traverses the hoop direction of a pipe or other substrate.

In some embodiments, a method for maximizing tensile strength and modulus of elasticity per ply in a reinforcement or repair operation via composite technology includes distributing the resin composition (600) through an open area (740) of the reinforcement fabric (100) until the reinforcement fabric (100) is saturated by the resin composition (600). In some embodiments, the resin composition (600) is distributed through the open area (740) of the reinforcement fabric (100) via the roller (720).

In some embodiments, a method for maximizing tensile strength and modulus of elasticity per ply in a reinforcement or repair operation via composite technology includes repeating the process of laying the fabric (100), applying the resin composition (600), and distributing the resin composition (600) until a desired thickness of the structural repair and reinforcement system (800) is reached. In some embodiments, one or more plys of reinforcement fabric (100) can be laid on a prepared substrate (700). In some embodiments, a ply is a single layer of the reinforcement fabric (100).

In some embodiments, a method for maximizing tensile strength and modulus of elasticity per ply in a reinforcement or repair operation via composite technology includes applying a finish coat of resin composition (600) to an exterior surface of the laid fabric (100). In some embodiments, the finish coat is applied to the exterior surface of the laid fabric (100) via the roller (720).

Structural Repair and Reinforcement Method Via Preimpregnated Composite Technology In some embodiments, a method for maximizing tensile strength and modulus of elasticity per ply in a reinforcement or repair operation via preimpregnated composite technology includes obtaining a structural repair and reinforcement system (810).

In some embodiments, the system (810) has a ply of reinforcement fabric (100) having a first fabric edge seam (210) located on a first fabric edge (220), and a second fabric edge seam (230) located on a second fabric edge (240). In some embodiments, the first fabric edge seam (210) traverses and binds the fabric (100) parallel and adjacent to the first fabric edge (220), and the second fabric edge seam (230) traverses and binds the fabric (100) parallel to and adjacent to the second fabric edge (240). In some embodiments, the first fabric edge (220) and second fabric edge (240) traverse the fabric (100) in the direction of an X-axis (0 degrees) (500).

In some embodiments, the fabric (100) has a pocket (300) with a first pocket edge (320), a second pocket edge (340), a pocket front surface (350), and a pocket rear surface (360). In some embodiments, the pocket (300) has a first pocket seam (310) located on the first pocket edge (320). In some embodiments, the first pocket seam (310) has a stitching (370) in a plane defined by the X-axis (0 degrees) (500) and a Z-axis (520) alternatingly attaching the pocket front surface (350) to the pocket rear surface (360) via the stitching (370). In some embodiments, the first pocket seam (310) traverses the fabric (100) parallel and adjacent to the first pocket edge (320).

In some embodiments, the pocket (300) has a second pocket seam (330) located on the second pocket edge (340). In some embodiments, the second pocket seam (330) has a stitching (370) in a plane defined by the X-axis (0 degrees) (500) and the Z-axis (520) alternatingly attaching the pocket front surface (350) to the pocket rear surface (360) via the stitching (370). In some embodiments, the second pocket seam (330) traverses the fabric (100) parallel and adjacent to the second pocket edge (340).

In some embodiments, the pocket front surface (350) has a pocket cross-stitch (380) that perpendicularly traverses the pocket (300) with respect to the first pocket seam (310) and the second pocket seam (330) in a direction of a Y-axis or 90 degrees (510). In some embodiments, the pocket rear surface (360) has a pocket cross-stitch (380) that perpendicularly traverses the pocket (300) with respect to the first pocket seam (310) and the second pocket seam (330) in the direction of the Y-axis or 90 degrees (510).

In some embodiments, the pocket cross-stitch (380) has a stitch first end (382) attached to the first pocket seam (310) and a stitch second end (384) attached to the second pocket seam (330).

In some embodiments, the pocket (300) traverses the fabric (100) parallel and adjacent to the first fabric edge (220) and the second fabric edge (240) in a warp, or 0 degree, or X-axis (500) direction.

In some embodiments, the fabric (100) has a fiber tow (400) with a plurality of filaments (410) located in a stack (420). In some embodiments, the fiber tow (400) is located lengthways in the direction of the X-axis (0 degrees) (500) in the pocket (300).

In some embodiments, the filament (410) is constructed from a material selected from a group consisting of: polyethylene, glass, basalt, aramid, and carbon.

In some embodiments, a modified vinyl ester resin composition (630) is located on the reinforcement fabric (100). In some embodiments, the modified vinyl ester resin composition (630) is cross-linked with urethane. In some embodiments, the modified vinyl ester resin composition (630) is cross-linked with another compound. In some embodiments, a modified vinyl ester resin composition is available as DION® 31038-00 that can be purchased from Reichhold (http://www.reichhold.com/en/composites-products.aspx?cat=Brands&pid=14) as of Dec. 21, 2011.

In some embodiments, the system (810) is stored until installed by an end user. In some embodiments, the system (810) has a shelf life of six months. In some embodiments, the system (810) can be stored in an environment having temperatures about ambient. In some embodiments, ambient temperature is less than about 60 degrees Fahrenheit. In some embodiments ambient temperature is about 60 degrees Fahrenheit to about 80 degrees Fahrenheit. In some embodiments, ambient temperature is about 8 In some embodiments, the system (810) has air-tight packaging (730).

In some embodiments, the system (810) is heat-activated. In some embodiments, the system (810) is activated for curing upon raising the temperature of the system (810) to about 275 degrees Fahrenheit for about 15 minutes. In some embodiments, the system (810) is activated upon exposure to water.

In some embodiments, a method for maximizing tensile strength and modulus of elasticity per ply in a reinforcement or repair operation via preimpregnated composite technology includes preparing a substrate (700) for application via cleaning the substrate (700). In some embodiments, loose particles, scale, surface oxidation, and oily films are removed via physical abrasion or power washing.

In some embodiments, a method for maximizing tensile strength and modulus of elasticity per ply in a reinforcement or repair operation via preimpregnated composite technology includes preparing a substrate (700) for application via priming the substrate (700) with a low-viscosity epoxy primer (710). In some embodiments, the primer is applied to the substrate (700) via a roller (720).

In some embodiments, a method for maximizing tensile strength and modulus of elasticity per ply in a reinforcement or repair operation via preimpregnated composite technology includes opening the air-tight packaging (730) and removing the reinforcement fabric (100) for use.

In some embodiments, a method for maximizing tensile strength and modulus of elasticity per ply in a reinforcement or repair operation via preimpregnated composite technology includes laying a ply of reinforcement fabric (100) on the prepared substrate (700). In some embodiments, the ply of reinforcement fabric (100) is laid in a direction wherein the pocket (300) linearly traverses the hoop direction of a pipe or other substrate.

In some embodiments, a method for maximizing tensile strength and modulus of elasticity per ply in a reinforcement or repair operation via preimpregnated composite technology includes compressing the reinforcement fabric (100) until the reinforcement fabric (100) is saturated by the resin composition (630). In some embodiments, the resin composition (630) is distributed through the open area (740) of the reinforcement fabric (100) via the roller (720).

In some embodiments, a method for maximizing tensile strength and modulus of elasticity per ply in a reinforcement or repair operation via preimpregnated composite technology includes repeating the process of laying the fabric (100), and distributing the resin composition (630) until the desired thickness of the preimpregnated structural repair and reinforcement system (810) is reached. In some embodiments, one or more plys of reinforcement fabric (100) can be laid on a prepared substrate (700). In some embodiments, a ply is a single layer of the reinforcement fabric (100).

In some embodiments, a reinforcement fiber housing matrix (900) for maximizing tensile strength and modulus of elasticity per ply for composite systems, the housing matrix (900) has a channel (910) with a first channel side (920), and a second channel side (930); and a fiber tow (400) with a plurality of filaments (410) located in a stack (420).

In some embodiments, the fiber tow (400) is located lengthways in the direction of the X-axis (0 degrees) (500) in the channel (910). In some embodiments, the channel (910) traverses the matrix parallel and adjacent to the first channel side (920) and the second channel side (930) in a warp, or 0 degree, or X-axis direction.

In some embodiments, a plurality of channels (910) is located in parallel in a series, with the first channel side (920) of a first channel (910) joined to a second channel side (930) of a second channel (910). In some embodiments, a plurality of channels (910) is joined in parallel in a series at the first channel side (920) and the second channel side (930) of each channel (910) in the series.

In some embodiments, the channel (910) has a cross-sectional shape of a polygon, for example, a triangle, a square, a rectangle, a hexagon or an octagon. In some embodiments, the channel (910) has a cross-sectional shape of an ellipse or a circle.

In some embodiments, a sub-channel (950) is located within the channel. In some embodiments, the sub-channel (950) is supported within the channel (910) via a structure. In some embodiments, the sub-channel (950) is a partitioned area of the channel (910).

In some embodiments, the sub-channel (950) has a cross-sectional shape of a polygon, for example, a triangle, a square, a rectangle, a hexagon or an octagon. In some embodiments, the sub-channel (950) has a cross-sectional shape of an ellipse or a circle.

In some embodiments, a polymer resin composition (600) is located in the sub-channel (950). In some embodiments, a corrosion resistant polymer resin composition (600) is located in the sub-channel (950). In some embodiments, a corrosion resistant compound is located in the sub-channel (950). In some embodiments, corrosion resistant filaments (410) are located in the sub-channel (950).

In some embodiments, a chemically resistant polymer resin composition (600) is located in the sub-channel (950). In some embodiments, a chemically resistant compound is located in the sub-channel (950). In some embodiments, chemically resistant filaments (410) are located in the sub-channel (950).

In some embodiments, a polymer resin composition (600) is located in the sub-channel (950), wherein the stack (420) is located in the channel (910). In some embodiments, a polymer resin composition (600) is located, alternatingly in the sub-channel (950) and the channel (910). In some embodiments, the stack (420) is located alternatingly in the sub-channel (950) and the channel (910).

In some embodiments, the channel (910) is constructed from a permeable material. In some embodiments, the channel (910) is constructed from a mesh material. In some embodiments, the channel (910) is constructed from a porous material. In some embodiments, the channel (910) is constructed from a metal, for example, aluminum or steel.

In some embodiments, the sub-channel (950) is constructed from a permeable material. In some embodiments, the sub-channel (950) is constructed from a mesh material. In some embodiments, the sub-channel (950) is constructed from a porous material. In some embodiments, the sub-channel (950) is constructed from a metal, for example, aluminum or steel.

In some embodiments, the channel (910) is located in a weft, or 90 degree, or Y-axis (510), direction with respect to the first channel side (920) and the second channel side (930).

In some embodiments, the fabric (100) is unidirectional, meaning greater than about 90% of the filaments (410) are oriented in a common direction. In some embodiments, the fabric (100) is bi-directional, meaning about 50% of the filaments (410) are oriented in a first direction, with the other about 50% of the filaments (410) are oriented in a direction perpendicular to the first direction. In some embodiments, the fabric (100) is layered in the 3 dimensional or Z-axis direction. In some embodiments, plys of the fabric (100) is rotationally oriented in 45 degree increments.

In some embodiments, the cross-sectional area of the stacks (420) is about 50% to 70% of the cross-sectional area of the channel (910). In some embodiments, the cross-sectional area of the stacks (420) is about 70% to 85% of the cross-sectional area of the channel (910). In some embodiments, the cross-sectional area of the stacks (420) is about 85% to 99.5% of the cross-sectional area of the channel (910).

In some embodiments, the volume of the stacks (420) in the channel (910) is about 50% to 70% of the volume of the channel (910). In some embodiments, the volume of the stacks (420) in the channel (910) is about 70% to 85% of the volume of the channel (910). In some embodiments, the volume of the stacks (420) in the channel (910) is about 85% to 99.5% of the volume of the channel (910).

As used herein, the term "about" refers to plus or minus 10% of the referenced number. For example, an embodiment wherein there are about 3000 filaments (410) includes between 2700 and 3300 filaments (410).

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A novel reinforcement fabric (100) system for maximizing tensile strength and modulus of elasticity per ply for composite systems comprising:
   (a) a first fabric edge seam (210) disposed on a first fabric edge (220) and a second fabric edge seam (230) disposed on a second fabric edge (240), said first fabric edge seam (210) traverses and binds the fabric (100) parallel and adjacent to the first fabric edge (220), said second fabric edge seam (230) traverses and binds the fabric (100) parallel to and adjacent to the second fabric edge (240), said first fabric edge (220) and second fabric edge (240) traverse the fabric (100) in the direction of an X-axis (0 degrees) (500);
   (b) a pocket (300) comprising a first pocket edge (320), a second pocket edge (340), a pocket front surface (350), and a pocket rear surface (360); said pocket comprising the pocket (300) has a first pocket seam (310) disposed on the first pocket edge (320), said first pocket seam (310) comprising a stitching (370) in a plane defined by the X-axis (0 degree) (500) and a Z-axis (520) alternatingly attaching the pocket front surface (350) to the pocket rear surface (360) via the stitching (370), said first pocket seam (310) traverses the fabric (100) parallel and adjacent to the first pocket edge (320), said pocket (300) comprising a second pocket seam (330) disposed on the second pocket edge (340), said second pocket seam (330) comprising a stitching (370) in a plane defined by the X-axis (0 degree) (500) and a Z-axis (520) alternatingly attaching the pocket front surface (350) to the pocket rear surface (360) via the stitching (370), said second pocket seam (330) traverses the fabric (100) parallel and adjacent to the second pocket edge (340), said pocket front surface (350) comprises a pocket cross-stitch (380), said pocket cross-stitch (380) perpendicularly traverses the pocket (300) with respect to the first pocket seam (310) and the second pocket seam (330) in a direction of a Y-axis or 90 degrees (510), said pocket rear surface (360) comprises a pocket cross-stitch (380), said pocket cross-stitch (380) perpendicularly traverses the pocket (300) with respect to the first pocket seam (310) and the second pocket seam (330) in a direction of a Y-axis or 90 degrees (510); and
   (c) a fiber tow (400) comprising a plurality of filaments (410) disposed in a stack (420), wherein the fiber tow (400) is disposed lengthways in the direction of the X-axis (0 degrees) (500) in the pocket (300);
   wherein the pocket front surface (350) has a pocket cross-stitch (380) disposed thereon, wherein the pocket cross-stitch (380) perpendicularly traverses the pocket (300) from the first pocket edge (320) to the second pocket edge (340) without penetrating through the fiber tow (400), and
   wherein the pocket rear surface (360) has a pocket cross-stitch (380) disposed thereon, wherein the pocket cross-stitch (380) perpendicularly traverses the pocket (300) from the first pocket edge (320) to the second pocket edge (340) without penetrating through the fiber tow (400).

2. The fabric (100) of claim 1, further comprising a plurality of pockets (300) joined in parallel in a series at a first pocket edge (320) and a second pocket edge (340) of each pocket (300) in the series.

3. The fabric (100) of claim 1, wherein the filament (410) is constructed from a material selected from a group consisting of: polyethylene, glass, basalt, aramid, and carbon.

4. The fabric (100) of claim 1, wherein the fiber tow (400) comprises from about 1 filament (410) to about 3,000 filaments (410).

5. The fabric (100) of claim 1, wherein the fiber tow (400) comprises from about 3,000 filaments (410) to about 6,000 filaments (410).

6. The fabric (100) of claim 1, wherein the fiber tow (400) comprises from about 6,000 filaments (410) to about 12,000 filaments (410).

7. The fabric (100) of claim 1, wherein the fiber tow (400) comprises from about 12,000 filaments (410) to about 50,000 filaments (410).

8. The fabric (100) of claim 1, wherein the fiber tow (400) comprises more than about 50,000 filaments (410).

9. The fabric (100) of claim 1, wherein the fiber tow (400) comprises a plurality of non-interlaced filaments (410).

10. The fabric (100) of claim 1, wherein the fiber tow (400) comprises a plurality of interlaced filaments (410).

11. The fabric (100) of claim 1, wherein the fiber tow (400) comprises a plurality of non-twisted filaments (410).

12. The fabric (100) of claim 1, wherein the fiber tow (400) comprises a plurality of twisted filaments (410).

13. The fabric (100) of claim 1, wherein the fiber tow (400) comprises a plurality of filaments (410) disposed one upon another forming a generally elliptical cross-section of the fiber tow (400) disposed in the pocket (300).

14. A structural repair and reinforcement system (800) for maximizing tensile strength and modulus of elasticity per ply via composite technology comprising a ply of the reinforcement fabric (100) according to claim 1, and a polymer resin composition (600).

15. A novel reinforcement fabric (100) system for maximizing tensile strength and modulus of elasticity per ply for composite systems comprising:
   (a) a first fabric edge seam (210) disposed on a first fabric edge (220) and a second fabric edge seam (230) disposed on a second fabric edge (240), said first fabric edge seam (210) traverses and binds the fabric (100) parallel and adjacent to the first fabric edge (220), said second fabric edge seam (230) traverses and binds the fabric (100) parallel to and adjacent to the second fabric edge (240), said first fabric edge (220) and second fabric edge (240) traverse the fabric (100) in the direction of an X-axis (0 degrees) (500);
   (b) a pocket (300) comprising a first pocket edge (320), a second pocket edge (340), a pocket front surface (350), and a pocket rear surface (360), said pocket comprising the pocket (300) has a first pocket seam (310) disposed on the first pocket edge (320), said first pocket seam (310) comprising a stitching (370) in a plane defined by the X-axis (0 degree) (500) and a Z-axis (520) alternatingly attaching the pocket front surface (350) to the pocket rear surface (360) via the stitching (370), said first pocket seam (310) traverses the fabric (100) parallel and adjacent to the first pocket edge (320), said pocket (300) comprising a second pocket seam (330) disposed on the second pocket edge (340), said second pocket seam (330) comprising a stitching (370) in a plane defined by the X-axis (0 degree) (500) and a Z-axis (520) alternatingly attaching the pocket front surface (350) to the pocket rear surface (360) via the stitching (370), said second pocket seam (330) traverses the fabric (100) parallel and adjacent to the second pocket edge (340), said pocket front surface (350) comprises a pocket cross-stitch (380), said pocket cross-stitch (380) perpendicularly traverses the pocket (300) with respect to the first pocket seam (310) and the second pocket seam (330) in a direction of a Y-axis or 90 degrees (510), said pocket rear surface (360) comprises a pocket cross-stitch (380), said pocket cross-stitch (380) perpendicularly traverses the pocket (300) with respect to the first pocket seam (310) and the second pocket seam (330) in a direction of a Y-axis or 90 degrees (510), wherein said pocket (300) traverses the fabric (100) parallel and adjacent to the first fabric edge (220) and the second fabric edge (240) in the direction of the X-axis (500); and
   (c) a fiber tow (400) comprising a plurality of filaments (410) disposed in a stack (420), wherein the fiber tow (400) is disposed lengthways in the direction of the X-axis (0 degrees) (500) in the pocket (300);
   wherein the pocket front surface (350) has a plurality of pocket cross-stitches (380) disposed thereon, each pocket cross-stitch (380) perpendicularly traversing the pocket (300) from the first pocket edge (320) to the second pocket edge (340) without penetrating through the fiber tow (400), and
   wherein the pocket rear surface (360) has a plurality of pocket cross-stitches (380) disposed thereon, each pocket cross-stitch (380) perpendicularly traversing the pocket (300) from the first pocket edge (320) to the second pocket edge (340) without penetrating through the fiber tow (400).

\* \* \* \* \*